F. A. MATTHEWS.
AUTOMOBILE JACK.
APPLICATION FILED JAN. 21, 1915.
1,183,894.
Patented May 23, 1916.
2 SHEETS—SHEET 1.
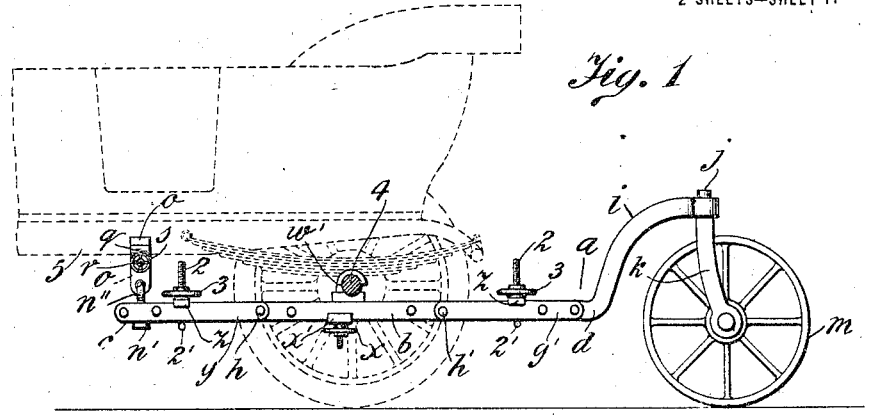
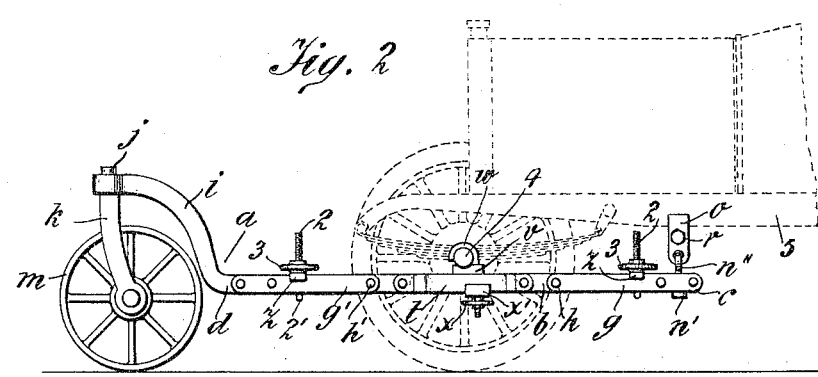
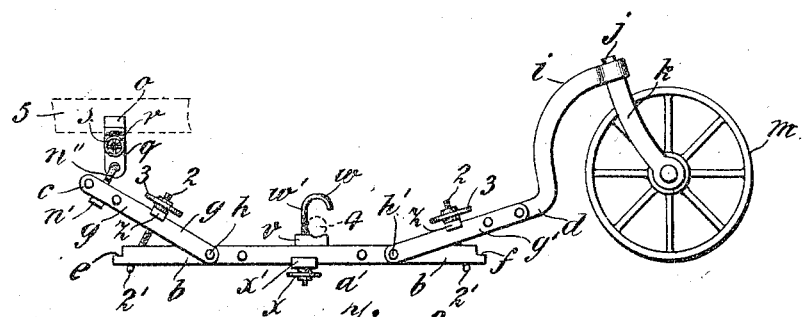
Witnesses:
A. Gutznagel
Milton Lax
Inventor
Francis A. Matthews
By his Attorney
James Hamilton

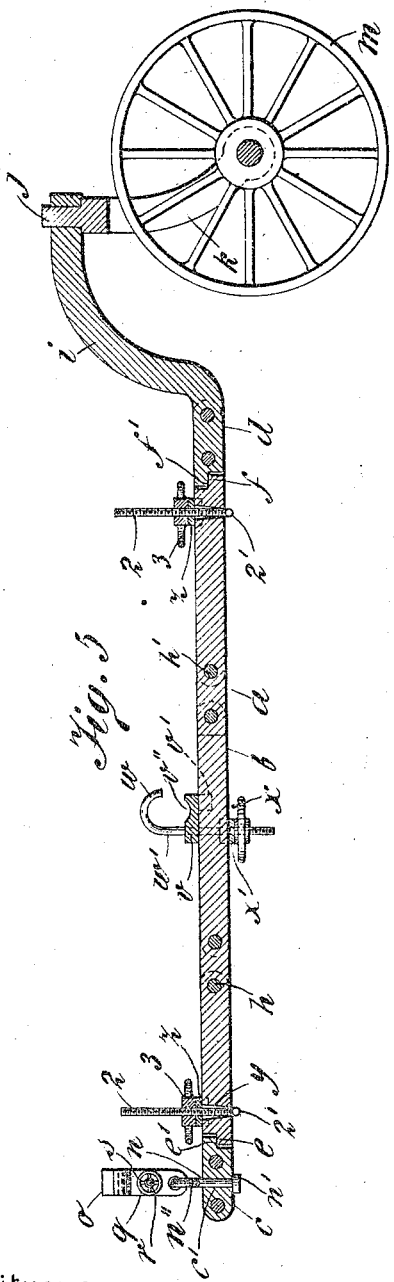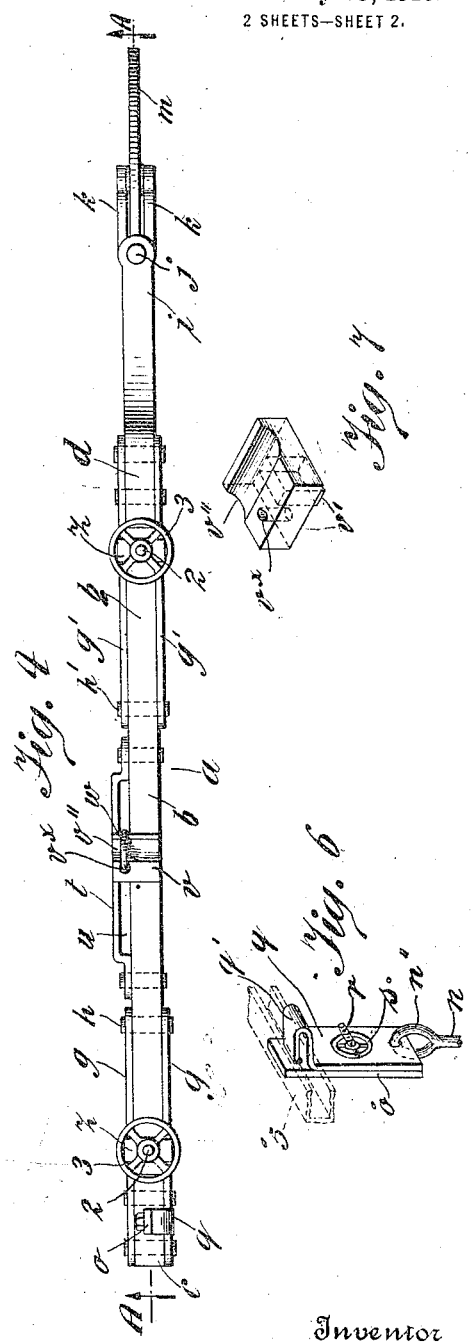

UNITED STATES PATENT OFFICE.

FRANCIS A. MATTHEWS, OF WELLINGTON, KANSAS.

AUTOMOBILE-JACK.

1,183,894.

Specification of Letters Patent.

Patented May 23, 1916.

Application filed January 21, 1915. Serial No. 3,440.

*To all whom it may concern:*

Be it known that I, FRANCIS A. MATTHEWS, a citizen of the United States of America, residing at Wellington, in the county of Sumner and State of Kansas, have invented certain new and useful Improvements in Automobile-Jacks, of which the following is a specification, reference being had to the accompanying drawings.

This invention relates to improvements in jacks and particularly to improvements in jacks for supporting automobiles having a broken axle (either a front or rear axle); and an object of this invention is to provide an automobile jack which will be simple in construction, comparatively cheap in manufacture, susceptible of being readily and easily applied and efficient, handy and convenient in operation and use.

In the drawings illustrating the principle of this invention and the best mode now known to me of applying that principle, Figure 1 is an elevation showing my new jack applied to an automobile having a broken rear axle; Fig. 2 is a similar view showing my new jack applied to an automobile having a broken front axle; Fig. 3 is an elevation of my new jack showing the three-part hinged construction of the same; Fig. 4 is a plan view; Fig. 5 is a central longitudinal section on the line A—A of Fig. 4; Fig. 6 is a detail showing in perspective the hanger or suspensory device by which the jack is fastened to the automobile body; and Fig. 7 is a detail illustrating in perspective the axle-rest or block.

The body part $a$ of the jack comprises the bar or shaft $b$ and the two end-pieces $c$, $d$, hinged thereto. Each end of the bar $b$ is formed with an offset or shoulder $e$, $f$. The end-piece $c$ is provided with a pair of arms $g$ between which lies one end of the bar $b$. A hinge-pin $h$ passes through the arms $g$ and the bar $b$; and the end-piece $c$ is free to swing on this hinge-pin $h$. The head portion of this end-piece $c$ is formed with a shoulder $e'$ which coacts with the shoulder $e$ so as to limit the relative movement of the end-piece $c$ and the bar $b$. Similarly the end-piece $d$ is formed with a pair of arms $g'$ through which and the bar $b$ there is passed a hinge-pin $h'$ on which the end-piece $d$ is free to swing. The latter is formed with an offset or shoulder $f'$ which coacts with the shoulder $f$ so as to limit the swinging movement of the end-piece $d$. This end-piece $d$ is curved upwardly at its outer end $i$, in which there is mounted free to turn a post $j$ which is forked and between the arms $k$ (or in the yoke portion) of which there is rotatably fastened a wheel $m$, so that this wheel $m$ is free to turn after the manner of the caster-wheel commonly used in cultivators and the like. Through a hole $c'$ in the head part of the other end-piece $c$ there is passed an eye-pin $n$ the lower end $n'$ of which is upset or headed and the upper end of which is formed with an eye $n''$. The upper end $n''$ of the eye-pin $n$ is engaged with the lower end of a plate $o$. The lower end of a second plate $q$ is similarly engaged with the upper end $n''$ of the eye-pin $n$ and the upper end $q'$ of this plate $q$ is bent toward the plate $o$ so as to form a hook. A bolt $r$ passes through the two plates $o$, $q$; and, by tightening the nut $s$ upon this bolt $r$, the two plates may be drawn closely toward each other.

At one side of the bar $b$ there is fastened a strap $t$ between which and the bar $b$ there is a slideway $u$ in which there is slidably and snugly fitted the guide-lug $v'$ that projects downwardly from the axle-rest or block $v$. The top or upper face of the block $v$ is formed with a depression $v''$ shaped so as to receive an axle-end 4. In the block $v$ there is formed a hole $v^x$ through which passes the leg $w'$ of a hook $w$. The lower end of the leg $w'$ is threaded; and upon this threaded end there is screwed a nut $x$. Between the nut $x$ and the bar $b$ there is interposed a washer-plate $x'$. Near each end of the bar $b$ there is formed a funnel-shaped hole $y$; and, over this hole $y$ and the arms $g$, $(g')$, there lies an inverted U-shaped washer-plate $z$. Through the hole $y$ and the plate $z$ and between the arms $g$, $(g')$ there passes a lifting-screw 2 with which is engaged a nut 3. The lower end 2' of the screw 2 is hook-shaped.

The operation of the device will be readily understood from the foregoing description taken in connection with the drawings and may be set forth briefly as follows: The parts of the jack being loosely connected (as is indicated in Fig. 3), the broken axle 4 is placed in the groove $v''$ of the axle-rest $v$. The lower flange of the chassis or frame 5 of the automobile is placed in the channel of the claw or hook $q'$ and the plate $o$ is brought against the back of the chassis 5, whereupon the nut $s$ is screwed up on the bolt r so as to fasten these two plates o, q, together and to secure the hanger or suspensory device firmly to the frame 5. The nut x is then turned until the hook w is firmly engaged with the axle-end 4 and locks the same securely in place. Thereafter the nuts 3 are turned until the end-pieces c, d, are forced into line with the bar b. The automobile may then be moved, resting upon its own three wheels and the caster-wheel m.

Fig. 2 shows my new jack applied to the front axle of a broken-down automobile.

I claim:

1. An automobile jack including a supporting bar; a wheel; an end-piece in the outer end of which said wheel is mounted and the inner end of which is hingedly connected with said bar; and means for securing said bar and end-piece in alinement with each other.

2. An automobile jack including a supporting bar; a wheel; an end-piece in the outer end of which said wheel is mounted and the inner end of which is hingedly connected with said bar; and a screw-and-nut device for securing said bar and end-piece in alinement with each other.

3. An automobile jack including a supporting bar; a wheel; an end-piece in the outer end of which said wheel is mounted and the inner end of which is hingedly connected with said bar; an axle-rest mounted on said bar; and means for securing said bar and end-piece in alinement with each other.

4. An automobile jack including a bar; a pair of end-pieces connected therewith; a support mounted on one of said end-pieces; a suspensory device attached to the other of said end pieces; and an axle-rest mounted on said bar.

5. An automobile jack including a bar; a pair of end-pieces hingedly connected therewith; a wheeled support mounted on one of said end-pieces; a suspensory device attached to the other of said end-pieces; means for securing said end-pieces in alinement with said bar; and an axle-rest mounted on the latter.

6. An automobile jack including a supporting bar; a wheel; an end-piece in the outer end of which said wheel is mounted and the inner end of which is hingedly connected with said bar; an axle-rest mounted on said bar; and a device for fastening the axle to said axle-rest.

7. An automobile jack including a wheeled support; an axle-rest mounted thereon; an end-piece hingedly connected to said support; means for securing said support and end-piece in alinement with each other; and a device for attaching the jack to the body of the automobile, said device being carried by said end-piece.

In testimony whereof I have hereunto set my hand at said Wellington this 31st day of December, A. D. 1914, in the presence of the two undersigned witnesses.

FRANCIS A. MATTHEWS.

Witnesses:
 FRANK T. BARLOW,
 IVAN D. ROGERS.